(12) United States Patent
Hu et al.

(10) Patent No.: US 10,050,875 B2
(45) Date of Patent: Aug. 14, 2018

(54) NETWORK SERVICE PROCESSING METHOD AND APPARATUS

(71) Applicant: Huawei Technologies Co., Ltd., Shenzhen (CN)

(72) Inventors: Xinyu Hu, Nanjing (CN); Yuping Zhao, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 111 days.

(21) Appl. No.: 15/166,072

(22) Filed: May 26, 2016

(65) Prior Publication Data

US 2016/0277292 A1 Sep. 22, 2016

Related U.S. Application Data

(63) Continuation of application No. PCT/CN2014/091333, filed on Nov. 18, 2014.

(30) Foreign Application Priority Data

Nov. 26, 2013 (CN) .......................... 2013 1 0613801
May 4, 2014 (CN) .......................... 2014 1 0185366

(51) Int. Cl.
*H04L 12/28* (2006.01)
*H04L 12/713* (2013.01)
(Continued)

(52) U.S. Cl.
CPC .......... *H04L 45/586* (2013.01); *G06F 9/5077* (2013.01); *H04L 41/0803* (2013.01);
(Continued)

(58) Field of Classification Search
CPC ... H04L 45/586; H04L 41/0803; H04L 49/70; H04L 41/0816; H04L 67/32
(Continued)

(56) References Cited

U.S. PATENT DOCUMENTS 6,763,375 B1   7/2004 Basso et al.
6,847,620 B1   1/2005 Meier
(Continued)

FOREIGN PATENT DOCUMENTS

CN   1422473 A   6/2003
CN   1612561 A   5/2005
(Continued)

OTHER PUBLICATIONS

Sugawara et al., "Design of an Application Layer Processing Engine using Dynamic Reconfiguration," IEICE Technical Report, pp. 7-12, the Institute of Electronics, Information and Communication Engineers, Tokyo, Japan (Dec. 24, 2005).
(Continued)

*Primary Examiner* — Chi H Pham
*Assistant Examiner* — Alexander O Boakye
(74) *Attorney, Agent, or Firm* — Leydig, Voit & Mayer, Ltd.

(57) ABSTRACT

A network service processing method and apparatus are provided. The method includes: partitioning a field-programmable gate array (FPGA) or a network processor (NP) into multiple mutually isolated service processing resources; receiving a first configuration instruction, where the first configuration instruction includes a first service configuration execution file; performing service configuration on a service processing resource according to the first service configuration execution file, so that the service processing resource performs service processing on a to-be-processed service packet; receiving a forwarding rule used when service forwarding is to be performed on the to-be-processed service packet; and receiving the to-be-processed service packet sent by a user terminal, and distributing the to-be-processed service packet to the service processing resource by using the forwarding rule, so that the service processing (Continued)

resource performs service processing on the to-be-processed service packet.

15 Claims, 7 Drawing Sheets

(51) Int. Cl.
    *H04L 29/08*         (2006.01)
    *G06F 9/50*          (2006.01)
    *H04L 29/06*         (2006.01)
    *H04L 12/24*         (2006.01)
    *H04L 12/931*       (2013.01)

(52) U.S. Cl.
    CPC .......... *H04L 41/0816* (2013.01); *H04L 49/70* (2013.01); *H04L 67/1006* (2013.01); *H04L 67/32* (2013.01); *H04L 69/12* (2013.01)

(58) Field of Classification Search
    USPC ........................................................ 370/389
    See application file for complete search history.

(56) References Cited

U.S. PATENT DOCUMENTS

2005/0169309 A1    8/2005    Tripathi et al.
2006/0126602 A1*   6/2006    Heinrich ............. G06F 17/3089
                                                            370/352
2008/0235396 A1    9/2008    James
2009/0031063 A1    1/2009    Ramaiah et al.
2010/0333101 A1   12/2010   Pope et al.
2013/0132536 A1    5/2013    Zhang et al.

FOREIGN PATENT DOCUMENTS

CN        101119276 A      2/2008
CN        101232506 A      7/2008
CN        101335644 A    12/2008
CN        101668036 A      3/2010
CN        103051529 A      4/2013
JP         2011175531 A     9/2011

OTHER PUBLICATIONS

Yin et al., "Customizing Virtual Networks with Partial FPGA Reconfiguration," ACM SIGCOMM Computer Communication Review, vol. 41, Issue 1, pp. 125-132, ACM, New York, New York (Jan. 2011).
CN201410185366.0, Office Action and Search Report, dated Jan. 30, 2018.

* cited by examiner

NETWORK SERVICE PROCESSING METHOD AND APPARATUS

CROSS-REFERENCE TO RELATED APPLICATIONS

This application is a continuation of International Patent Application No. PCT/CN2014/091333, filed on Nov. 18, 2014, which claims priority to Chinese Patent Application No. 201310613801.0, filed on Nov. 26, 2013, and Chinese Patent Application No. 201410185366.0, filed on May 4, 2014, all of which are hereby incorporated by reference in their entireties.

TECHNICAL FIELD

The present disclosure relates to the field of communications technologies, and in particular, to a network service processing method and apparatus.

BACKGROUND

With rapid growth of computing capabilities of servers in a communications system, an increasing quantity of network services (such as a firewall service) need to be urgently migrated from conventional dedicated device platforms to servers. Currently, as a main trend of development of a next generation communication network, a network virtualization technology gradually implements various network service functions by using three types of general devices: a server, a switch, and a storage device. A network service function is implemented in the foregoing manner, which can implement flexible and convenient deployment of services and reduce development costs.

To meet flexible and convenient deployment of services, a virtualization technology is generally used on a server. Currently, a virtual machine manager (hypervisor software) runs on the server to virtualize one physical server into multiple servers, so that multiple different pieces of network service processing software that do not affect each other are conveniently deployed on a same server.

However, a solution to implementing network service processing in the prior art has the following disadvantages: After a server uses hypervisor software, upon receiving a packet, a network interface card of the server needs to transmit the packet to a virtual switch (vswitch) by using the hypervisor software; a processor in the server identifies the packet in the vswitch, and the vswitch distributes the packet, so as to correctly deliver the packet to a different virtual machine (VM); and upon receiving the packet, the VM performs service processing on the packet. However, when there are a relatively large quantity of packets, the vswitch can deliver the packets to correct VMs only after the processor identifies each received packet, which greatly increases workload of the processor, and reduces distribution efficiency in processing a packet by the processor. In addition, it also shows that efficiency in processing a packet by the processor is greatly decreased compared with that before virtualization.

SUMMARY

Embodiments of the present disclosure provide a network service processing method and apparatus, so as to solve a problem of low efficiency in processing a packet by a server in the prior art.

According to a first aspect, an embodiment of the present disclosure provides a network service processing method, where the method includes:
partitioning a field-programmable gate array (FPGA) or a network processor (NP) into multiple mutually isolated service processing resources;
receiving a first configuration instruction, where the first configuration instruction includes a first service configuration execution file;
performing service configuration on a service processing resource according to the first service configuration execution file, so that the service processing resource performs service processing on a to-be-processed service packet;
receiving a forwarding rule used when service forwarding is to be performed on the to-be-processed service packet; and
receiving the to-be-processed service packet sent by a user terminal, and distributing the to-be-processed service packet to the service processing resource by using the forwarding rule, so that the service processing resource performs service processing on the to-be-processed service packet.

In a first possible implementation manner, the distributing the to-be-processed service packet to the service processing resource by using the forwarding rule includes:
determining, by using the forwarding rule, a quantity of service processing resources that are to perform service processing on the to-be-processed service packet; and
when it is determined that one service processing resource is to perform service processing on the to-be-processed service packet, distributing the to-be-processed service packet to the determined one service processing resource; or
when it is determined that multiple service processing resources are to perform service processing on the to-be-processed service packet, determining a processing sequence for the service processing resources to process the to-be-processed service packet, and distributing, according to the determined processing sequence, the to-be-processed service packet to the first service processing resource in the processing sequence.

With reference to the first aspect or the first possible implementation manner of the first aspect, in a second possible implementation manner, the method further includes:
when the service processing resource performs service processing on the to-be-processed service packet, collecting, by the FPGA or the NP, statistics about a service performance parameter used for performing performance monitoring on the service processing resource; and
sending, by the FPGA or the NP, the service performance parameter to a network server, where the service performance parameter is used as a basis for the network server to adjust service load for the service processing resource.

In a third possible implementation manner, the method further includes: when the service processing resource needs to have a different service function, receiving a delivered second configuration instruction, where the second configuration instruction includes a second service configuration execution file; and
performing service reconfiguration on the service processing resource according to the second service configuration execution file.

According to a second aspect, an embodiment of the present disclosure provides a network service processing apparatus, where the apparatus includes: a processor, and an FPGA or an NP, where the processor is configured to partition the FPGA or the NP into multiple mutually isolated service processing resources;

the processor is further configured to: receive a first configuration instruction, where the first configuration instruction includes a first service configuration execution file; and perform service configuration on a service processing resource according to the first service configuration execution file, so that the service processing resource performs service processing on a to-be-processed service packet;

the FPGA or the NP is configured to receive a forwarding rule used when service forwarding is to be performed on the to-be-processed service packet; and the FPGA or the NP is further configured to: receive the to-be-processed service packet sent by a user terminal, and distribute the to-be-processed service packet to the service processing resource by using the forwarding rule, so that the service processing resource performs service processing on the to-be-processed service packet.

In a first possible implementation manner, the processor is further configured to: when the service processing resource needs to have a different service function, receive a second configuration instruction delivered by a network server, where the second configuration instruction includes a second service configuration execution file; and perform service reconfiguration on the service processing resource according to the second service configuration execution file.

With reference to the second aspect or the first possible implementation manner of the second aspect, in a second possible implementation manner, the processor includes: a service adaptation module; and the FPGA or the NP includes: a receiving classification module and the service processing resource; where the service adaptation module is configured to: perform service configuration on the service processing resource according to the first service configuration execution file, and perform service reconfiguration on the service processing resource according to the second service configuration execution file;

the receiving classification module is configured to set the forwarding rule on the receiving classification module; and the service processing resource is configured to set the forwarding rule on the service processing resource.

With reference to the second possible implementation manner of the second aspect, in a third possible implementation manner, the receiving classification module is configured to: determine, according to the forwarding rule, a quantity of service processing resources that are to perform service processing on the to-be-processed service packet; and when it is determined that one service processing resource is to perform service processing on the to-be-processed service packet, distribute the to-be-processed service packet to the determined one service processing resource; or when it is determined that multiple service processing resources are to perform service processing on the to-be-processed service packet, determine a processing sequence for the service processing resources to process the to-be-processed service packet, and distribute, according to the determined processing sequence, the to-be-processed service packet to the first service processing resource in the processing sequence.

With reference to the third possible implementation manner of the second aspect, in a fourth possible implementation manner, the service processing resource is further configured to:

receive the to-be-processed service packet transmitted by the receiving classification module;

perform corresponding service processing on the to-be-processed service packet;

determine, according to the forwarding rule, a next-level service processing resource that is to perform service processing on the to-be-processed service packet; and transmit a processed service packet to the next-level service processing resource.

With reference to the second aspect or the third or fourth possible implementation manner of the second aspect, in a fifth possible implementation manner, the apparatus further includes: a statistics collecting module; where the statistics collecting module is configured to: when the service processing resource performs service processing on the to-be-processed service packet, collect statistics about a service performance parameter used for performing performance monitoring on the service processing resource, and send the service performance parameter to the service adaptation module; and the service adaptation module is further configured to send the service performance parameter to a network server, where the service performance parameter is used as a basis for the network server to adjust service load for the service processing resource.

In a sixth possible implementation manner, the FPGA or NP further includes:

a sending and transmitting module, configured to: receive a service packet processed by the service processing resource, and output the service packet; and a forwarding module, configured to forward the service packet between the receiving classification module and the service processing resource; and further configured to forward the service packet between the multiple service processing resources.

According to the network service processing method and apparatus provided in the embodiments of the present disclosure, service configuration is performed, according to a configuration instruction, on multiple mutually isolated service processing resources into which an FPGA or an NP is partitioned, so that the service processing resource performs service processing on a to-be-processed service packet; and a forwarding rule used when service forwarding is to be performed on the to-be-processed service packet is received, so that the to-be-processed service packet is distributed to the service processing resource according to the forwarding rule, and the service processing resource performs service processing on the to-be-processed service packet. Fast and flexible distribution of a service packet is implemented, a problem in the prior art that distribution efficiency in processing a packet by a processor is reduced because the processor needs to identify and distribute each received packet when there are a relatively large quantity of packets is avoided, and efficiency in processing a packet by a server is improved. In addition, the service processing resource may further have a different service function according to a different configuration, so that a function of the service processing resource can be changed at any time, and the service processing resource can be reconfigured, which improves efficiency in processing a service packet by each service processing resource.

DESCRIPTION OF EMBODIMENTS

To make the objectives, technical solutions, and advantages of the embodiments of the present disclosure clearer, the following describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

To provide a thorough understanding of the present disclosure, the following uses specific embodiments to provide further explanation with reference to the accompanying drawings, and the embodiments do not constitute a limitation on the present disclosure.

Embodiment 1

Figure 1:
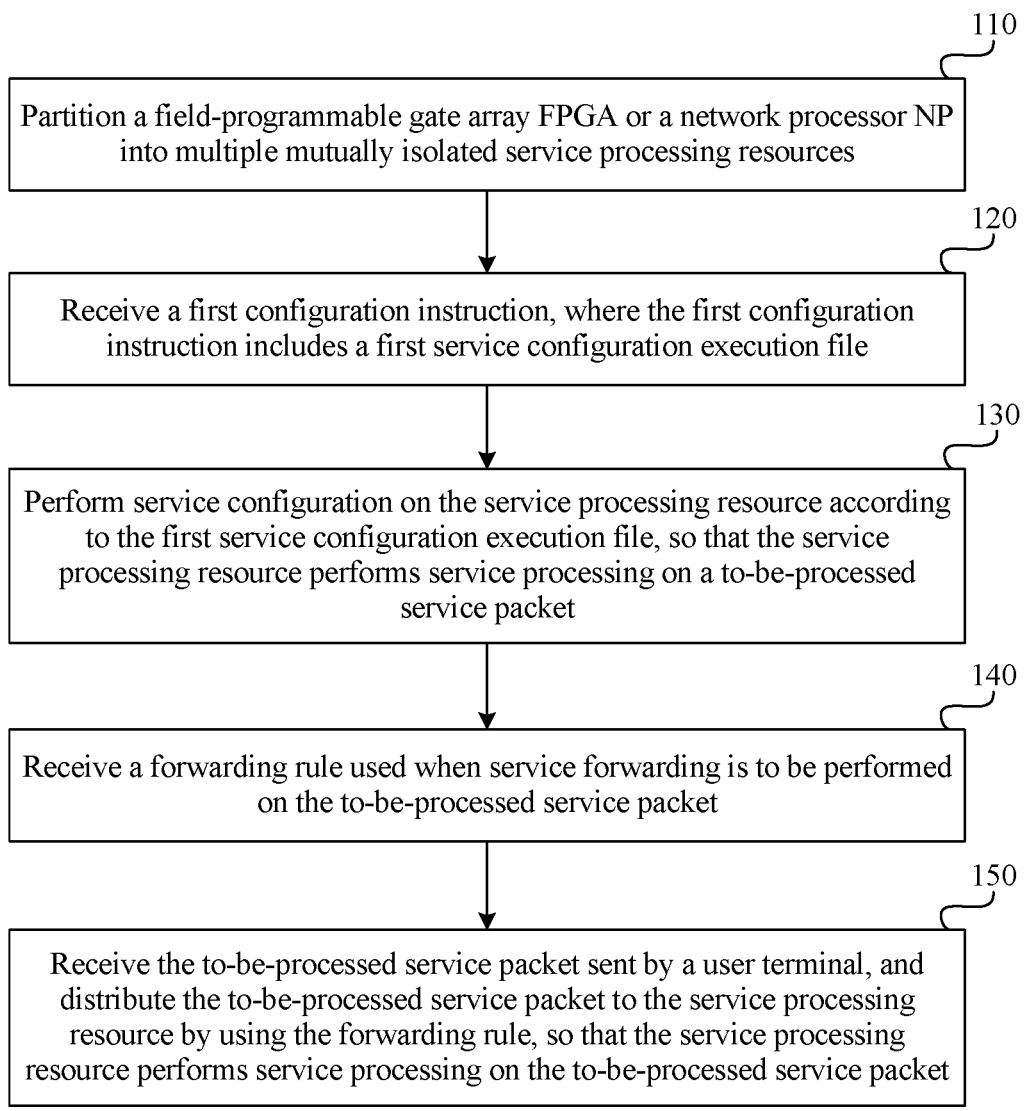
FIG. 1 is a flowchart of a network service processing method according to an embodiment of the present disclosure.

The following uses FIG. 1 as an example to describe in detail a network service processing method provided in an embodiment of the present disclosure. FIG. 1 is a flowchart of the network service processing method according to this embodiment of the present disclosure. In this embodiment of the present disclosure, the following steps are executed by a network service processing apparatus that executes the network service processing method. As shown in FIG. 1, this embodiment includes the following steps:

Step 110: Partition a field-programmable gate array (FPGA) or a network processor (NP) into multiple mutually isolated service processing resources.

Specifically, the network service processing apparatus involved in this embodiment of the present disclosure includes a processor and the FPGA; or the network service processing apparatus includes a processor and the NP.

The processor partitions the FPGA or the NP into the multiple mutually isolated service processing resources.

As an example instead of a limitation, a method for the isolation includes: if the apparatus includes the FPGA, partitioning, by using a PR/PRR partitioning technology in one FPGA, the FPGA into multiple mutually isolated wiring partitions; or if the apparatus includes the NP, grouping different quantities of processor cores into different groups by using a processor core grouping method in the NP, so as to obtain the multiple service processing resources by means of partitioning.

Step 120: Receive a first configuration instruction, where the first configuration instruction includes a first service configuration execution file.

Specifically, in an example, the network service processing apparatus receives a first configuration instruction sent by a network server, where the first configuration instruction includes a first service configuration execution file. The first service configuration execution file includes a service configuration file and a service execution file, where the service configuration file is a programming file related to service configuration, and the like; and the service execution file is a programming file related to implementing a service function by a service processing resource, and the like.

The network service processing apparatus may receive a first configuration instruction sent by another device except the network server. In this embodiment of the present disclosure, an example in which the network service processing apparatus receives the first configuration instruction sent by the network server is used for description.

Further, the first configuration instruction further includes identification information of a service processing resource. The service processing apparatus determines, by using the identification information, a service processing resource on which service configuration is to be performed. The identification information may be carried in the service configuration file or the identification information is separately carried in the first configuration instruction.

As an example instead of a limitation, the network service processing apparatus performs service function configuration on the service processing resource according to the first service configuration execution file, so that the service processing resource has a function for implementing processing of a service, for example, a network address translation (NAT) service, a Point-to-Point Protocol over Ethernet (PPPoE) service, or a deep packet inspection (DPI) service, so as to perform service processing on a to-be-processed service packet.

Step 130: Perform service configuration on a service processing resource according to the first service configuration execution file, so that the service processing resource performs service processing on the to-be-processed service packet.

Specifically, the network service processing apparatus performs service configuration on the service processing resource according to the first service configuration execution file, so that the service processing resource performs service processing on the to-be-processed service packet according to a configured service.

It may be understood that, when service configuration is performed on the service processing resource, multiple service processing resources may also be configured for a same service.

Step 140: Receive a forwarding rule used when service forwarding is to be performed on the to-be-processed service packet.

Specifically, in an example, the network service processing apparatus receives a forwarding rule that is configured by the network server and used when service forwarding is to be performed on the to-be-processed service packet. Further, the network server configures the forwarding rule on the FPGA or the NP.

The network service processing apparatus may receive a forwarding rule configured by another device except the network server. In this embodiment of the present disclosure, an example in which the network service processing apparatus receives the forwarding rule configured by the network server is used for description.

Further, a rule characteristic used when service forwarding is to be performed on each service packet for which service processing needs to be executed, identification information of a service processing resource matched with the rule characteristic, and address information of the service processing resource are stored in the forwarding rule. That is, only a service packet that meets the rule characteristic can be forwarded to the matched service processing resource by using the address information of the service processing resource, and service processing is performed by the service processing resource; otherwise, discarding processing is performed on a service packet that does not meet the rule characteristic. As an example instead of a limitation, the rule is IP address information, port number information, or a VLANID identifier of a packet for which service processing needs to be executed, where the IP address information may be a source IP address information or a destination IP address information, which is not limited thereto.

In an example, a rule characteristic included in the forwarding rule includes multiple IP address ranges of a service packet for which service processing needs to be executed, and identification information of a service processing resource matched with each IP address range, and address information of the service processing resource. It may be understood that the forwarding rule may be presented in a form of a table. For example, a service packet with a first IP address range matches an identifier of a first service processing resource; in other words, when an IP address of a to-be-processed service packet received by the network service processing apparatus falls within the first IP address range, the network service processing apparatus transmits, according to the address information of the service processing resource, the to-be-processed service packet to the first service processing resource that matches the first IP address range.

In this embodiment of the present disclosure, a time sequence relationship may not be limited among step 120, step 130, and step 140.

Step 150: Receive the to-be-processed service packet sent by a user terminal, and distribute the to-be-processed service packet to the service processing resource by using the forwarding rule, so that the service processing resource performs service processing on the to-be-processed service packet.

Specifically, after executing the foregoing step 110 to step 140, the network service processing apparatus receives, after performing multiple configurations, the to-be-processed service packet sent by the user terminal.

The network service processing apparatus distributes the to-be-processed service packet by using the forwarding rule, and transmits the to-be-processed service packet to a corresponding service processing resource, and the service processing resource performs corresponding service processing on the received to-be-processed service packet, so as to improve efficiency of processing a service packet.

Further, the distributing the to-be-processed service packet to the service processing resource by using the forwarding rule includes:

determining, by the network service processing apparatus by using the forwarding rule, a quantity of service processing resources that are to perform service processing on the to-be-processed service packet.

The determining a quantity of service processing resources that are to perform service processing on the to-be-processed service packet is specifically: determining that the to-be-processed service packet needs only a single service processing resource to implement corresponding service processing or needs multiple service processing resources to jointly implement corresponding service processing.

The distributing the to-be-processed service packet to the service processing resource includes:

when the network service processing apparatus determines that one service processing resource is to perform service processing on the to-be-processed service packet, the network service processing apparatus acquires address information of the service processing resource from the forwarding rule, and directly distributes the to-be-processed service packet to the determined service processing resource according to the address information of the service processing resource; or when the network service processing apparatus determines that multiple service processing resources are to perform service processing on the to-be-processed service packet, the network service processing apparatus determines a processing sequence for the service processing resources to process the to-be-processed service packet, acquires, according to the determined processing sequence, address information of the multiple service processing resources from the forwarding rule, and distributes the to-be-processed service packet to the first service processing resource according to address information of the first service processing resource in the processing sequence.

According to the network service processing method provided in this embodiment of the present disclosure, service configuration is performed, according to a configuration instruction, on multiple mutually isolated service processing resources into which an FPGA or an NP is partitioned, so that the service processing resource performs service processing on a to-be-processed service packet; and a forwarding rule used when service forwarding is to be performed on the to-be-processed service packet is received, so that the to-be-processed service packet is distributed to the service processing resource according to the forwarding rule, and the service processing resource performs service processing on the to-be-processed service packet. Fast and flexible distribution of a service packet is implemented, a problem in the prior art that distribution efficiency in processing a packet by a processor is reduced because the processor needs to identify and distribute each received packet when there are a relatively large quantity of packets is avoided, and efficiency in processing a packet by a server is improved. In addition, the service processing resource may further have a different service function according to a different configuration, so that a function of the service processing resource can be changed at any time, and the service processing resource can be reconfigured, which improves efficiency in processing a service packet by each service processing resource.

Optionally, in this embodiment of the present disclosure, at the same time when the service processing resource performs service processing on the to-be-processed service packet, a step of collecting statistics about a service performance parameter is included, where the service performance parameter is used for performing performance monitoring on the service processing resource. By performing performance monitoring on the service processing resource, a network operator to which the network server belongs can perform real-time monitoring on performance of each service processing resource, and meanwhile can further perform function adjustment on each service processing resource, to appropriately allocate network resources. Specific steps are as follows:

when the service processing resource performs service processing on the to-be-processed service packet, collecting, by the FPGA or the NP, statistics about a service performance parameter used for performing performance monitoring on the service processing resource; and sending, by the FPGA or the NP, the service performance parameter to the network server, where the service performance parameter is used as a basis for the network server to adjust service load for the service processing resource.

Specifically, when each service processing resource performs corresponding service processing on the to-be-processed service packet, the FPGA or the NP collects, according to a service configuration of each service processing resource, statistics about a service performance parameter used for performing performance monitoring on each service processing resource. As an example instead of a limitation, the service performance parameter includes service traffic and a service performance status of each service processing resource. The service performance status refers to a remaining service packet processing capability after each service processing resource processes a service packet.

In this embodiment of the present disclosure, because services configured for service processing resources are different, the FPGA or the NP collects statistics about service performance parameters corresponding to the service processing resources. For example, statistics about density of service packets received by each service processing resource, or sizes of service packets received by each service processing resource, or access density for accessing an on-chip/off-chip memory, or an accessed data volume is collected according to a service configured for the service processing resource.

After the service performance parameter of each service processing resource is determined, the FPGA or the NP sends the service performance parameter to the network server, where the service performance parameter is used as a basis for the network server to adjust service load for the service processing resource.

Further, the network server determines, according to the service performance parameter, whether the service processing resource needs to be changed, and when the service processing resource needs to be changed, according to the service performance parameter, the network server performs capacity expansion processing on the service processing resource or performs service reconfiguration processing on the service processing resource. In this way, the network operator to which the network server belongs can perform real-time monitoring on performance of each service processing resource, and meanwhile can further perform function adjustment on each service processing resource, to appropriately allocate network resources.

Optionally, in this embodiment of the present disclosure, the network server may further execute a step of performing reconfiguration on the service processing resource, so that a function of the service processing resource can be changed at any time, and the service processing resource can be reconfigured, which improves efficiency in processing a service packet by each service processing resource. Specific steps are as follows:

when the service processing resource needs to have a different service function, receiving a second configuration instruction, where the second configuration instruction includes a second service configuration execution file; and performing service reconfiguration on the service processing resource according to the second service configuration execution file.

Specifically, in an example, the network server may perform function adjustment on each service processing resource according to a service performance parameter, so as to achieve an objective of appropriately allocating network resources.

When the service processing resource needs to have a different service function, the network service processing apparatus receives a second configuration instruction delivered by the network server, where the second configuration instruction includes a second service configuration execution file. The network service processing apparatus performs, according to the second service configuration execution file, service reconfiguration on a service processing resource that has a service function, so as to change a function of the service processing resource and improve efficiency in processing a service packet by each service processing resource.

The network service processing apparatus may further receive a second configuration instruction sent by another device except the network server. In this embodiment of the present disclosure, an example in which the network service processing apparatus receives the second configuration instruction sent by the network server is used for description.

It may be understood that the second service configuration execution file included in the second configuration instruction and the first service configuration execution file included in the first configuration instruction are used for implementing different service functions, so that the service processing resource has different service functions.

The second service configuration execution file included in the second configuration instruction includes a service configuration file and a service execution file, where the service configuration file is a programming file related to service configuration, and the like; and the service execution file is a programming file related to implementing a service function by a service processing resource, and the like.

The second configuration instruction further includes identification information of a service processing resource. The service processing apparatus determines, by using the identification information, a service processing resource on which service reconfiguration is to be performed. The identification information may be carried in the service configuration file or the identification information is separately carried in the second configuration instruction.

In step 110 in this embodiment of the present disclosure, the multiple mutually isolated service processing resources obtained by means of partitioning are blank service processing resources that do not have a service processing function or blank service processing resources that have a service processing function.

In one implementation manner, when a service processing resource obtained by means of partitioning is a blank service processing resource, service configuration is performed on the blank service processing resource according to step 120 to step 130, and service reconfiguration may be performed on the service processing resource according to these steps.

In another implementation manner, when a service processing resource obtained by means of partitioning is a non-blank service processing resource, service reconfiguration is performed on the non-blank service processing resource according to step 120 to step 130, and service reconfiguration may be performed again on the service processing resource according to these steps.

Embodiment 2

Figure 2:
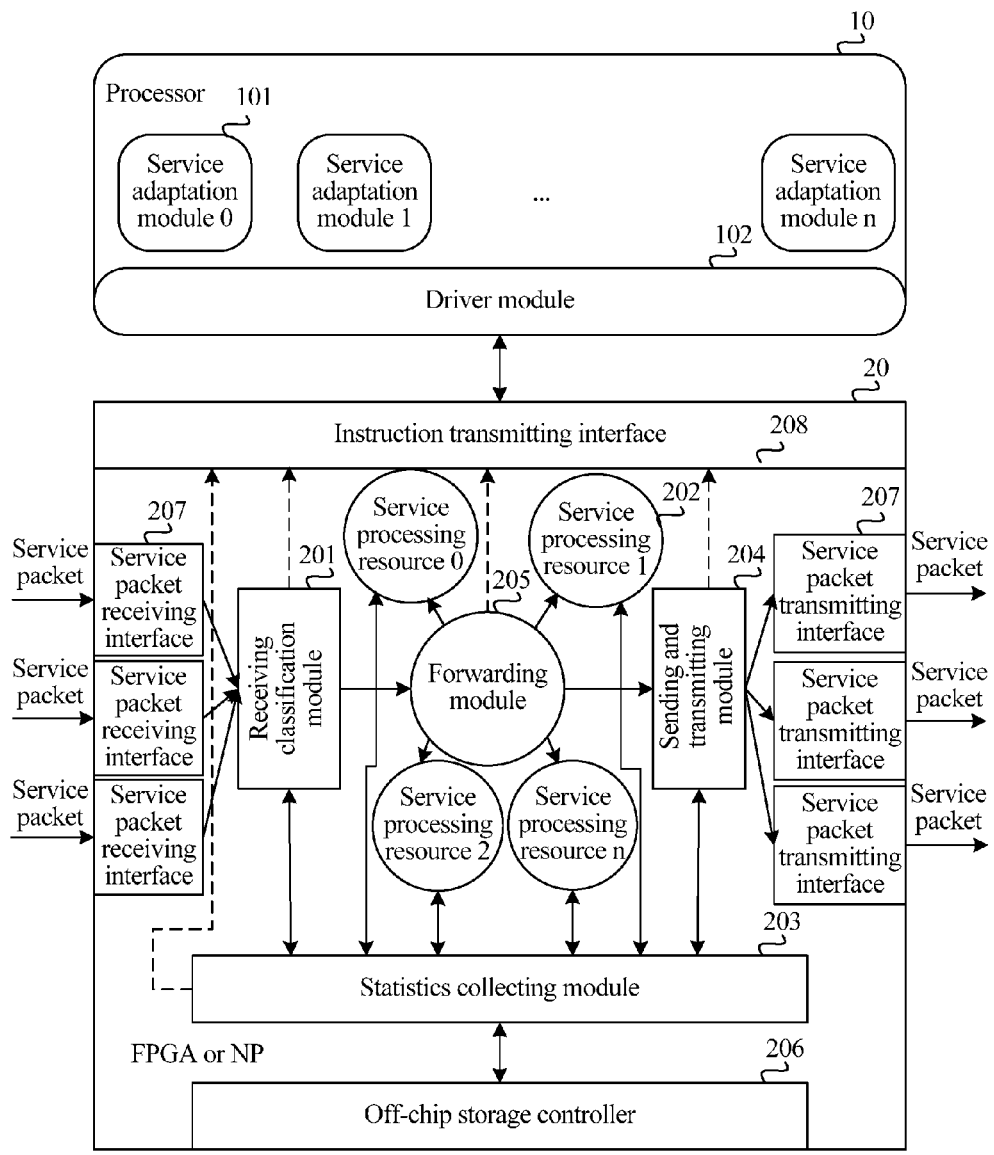
FIG. 2 is a schematic structural diagram of a network service processing apparatus according to an embodiment of the present disclosure.

Accordingly, an embodiment of the present disclosure further provides a network service processing apparatus. An implementation structure of the apparatus is shown in FIG. 2, and the apparatus is configured to implement the network service processing method in Embodiment 1 of the present disclosure in the foregoing. The apparatus includes a processor 10, and an FPGA20 or an NP20.

The processor 10 is configured to partition the FPGA or the NP into multiple mutually isolated service processing resources 202.

The processor 10 is further configured to: receive a first configuration instruction, where the first configuration instruction includes a first service configuration execution file; and perform service configuration on a service processing resource according to the first service configuration execution file, so that the service processing resource performs service processing on a to-be-processed service packet.

The FPGA20 or the NP20 is configured to receive a forwarding rule used when service forwarding is to be performed on the to-be-processed service packet.

The FPGA20 or the NP20 is further configured to: receive the to-be-processed service packet sent by a user terminal, and distribute the to-be-processed service packet to the service processing resource by using the forwarding rule, so that the service processing resource performs service processing on the to-be-processed service packet.

The processor 10 is further configured to: when the service processing resource needs to have a different service function, receive a second configuration instruction, where the second configuration instruction includes a second service configuration execution file; and perform service reconfiguration on the service processing resource according to the second service configuration execution file.

The processor 10 includes: a service adaptation module 101; and the FPGA20 or the NP20 includes: a receiving classification module 201 and the service processing resource.

The service adaptation module 101 is configured to: perform service configuration on the service processing resource according to the first service configuration execution file, and perform service reconfiguration on the service processing resource according to the second service configuration execution file.

The receiving classification module 201 is configured to set the forwarding rule on the receiving classification module.

The service processing resource 202 is configured to set the forwarding rule on the service processing resource.

The receiving classification module 201 is configured to: determine, according to the forwarding rule, a quantity of service processing resources that are to perform service processing on the to-be-processed service packet; and when it is determined that one service processing resource is to perform service processing on the to-be-processed service packet, distribute the to-be-processed service packet to the determined one service processing resource; or when it is determined that multiple service processing resources are to perform service processing on the to-be-processed service packet, determine a processing sequence for the service processing resources to process the to-be-processed service packet, and distribute, according to the determined processing sequence, the to-be-processed service packet to the first service processing resource in the processing sequence.

The service processing resource 202 is further configured to: receive the to-be-processed service packet transmitted by the receiving classification module;

perform corresponding service processing on the to-be-processed service packet;

determine, according to the forwarding rule, a next-level service processing resource that is to perform service processing on the to-be-processed service packet; and transmit a processed service packet to the next-level service processing resource.

The FPGA20 or the NP20 further includes: a statistics collecting module 203.

The statistics collecting module 203 is configured to: when the service processing resource performs service processing on the to-be-processed service packet, collect statistics about a service performance parameter used for performing performance monitoring on the service processing resource, and send the service performance parameter to the service adaptation module.

The service adaptation module 101 is further configured to send the service performance parameter to a network server, where the service performance parameter is used as a basis for the network server to adjust service load for the service processing resource.

The FPGA20 or the NP20 further includes: a sending and transmitting module 204, configured to: receive a service packet processed by the service processing resource, and output the service packet; and a forwarding module 205, configured to forward the service packet between the receiving classification module and the service processing resource; and further configured to forward the service packet between the multiple service processing resources.

The processor 10 further includes: a driver module 102, configured to provide a uniform interface for the service adaptation module.

In this embodiment of the present disclosure, the service adaptation module 101 may be disposed in another entity instead of being disposed in the processor.

The FPGA20 or the NP20 further includes: an off-chip storage controller 206, configured to: manage multiple off-chip memories and provide an access interface of a uniform standard;

a packet transceiving interface 207, configured to receive a service packet sent by an external device, or send a service packet to an external device; and an instruction transmitting interface 208, configured to receive an instruction sent by the network server, or receive an instruction transmitted by the driver module or the service adaptation module located in the processor.

It should be noted that each service processing resource 202 included in the FPGA20 or the NP20 is in a one-to-one correspondence with each service adaptation module 101 included in the processor 10, that is, one service adaptation module 101 performs configuration and processing on one service processing resource 202. Certainly, in an actual application, multiple service processing resources 202 may be corresponding to one service adaptation module 101. When the network service processing apparatus includes at least one service processing resource 202, the network server delivers at least one first configuration instruction to at least one service adaptation module 101, and each first configuration instruction includes a first service configuration execution file. Each service adaptation module 101 performs service configuration on a corresponding service processing resource 202. When performing service configuration, the service adaptation module 101 configures only one service for the service processing resource 202, so that when receiving a service packet, each service processing resource 202 processes only one service for the to-be-processed service packet. In addition, a configuration of the service processing resource 202 may be changed according to a different configuration instruction sent by the network server, for example, the second configuration instruction that is sent by the network server and involved in the foregoing embodiment. The second configuration instruction includes a second service configuration execution file, so that a service function of the service processing resource 202 can be changed at any time, and the service processing resource 202 can be reconfigured, which improves processing efficiency of each service processing resource 202, and prevents function changelessness.

According to the network service processing apparatus provided in this embodiment of the present disclosure, service configuration is performed, according to a configuration instruction, on multiple mutually isolated service processing resources into which an FPGA or an NP is partitioned, so that the service processing resource performs service processing on a to-be-processed service packet; and a forwarding rule used when service forwarding is to be performed on the to-be-processed service packet is received, so that the to-be-processed service packet is distributed to the service processing resource according to the forwarding rule, and the service processing resource performs service processing on the to-be-processed service packet. Fast and flexible distribution of a service packet is implemented, a problem in the prior art that distribution efficiency in processing a packet by a processor is reduced because the processor needs to identify and distribute each received packet when there are a relatively large quantity of packets is avoided, and efficiency in processing a packet by a server is improved. In addition, the service processing resource may further have a different service function according to a different configuration, so that a function of the service processing resource can be changed at any time, and the service processing resource can be reconfigured, which improves efficiency in processing a service packet by each service processing resource.

Embodiment 3

To help understand this embodiment of the present disclosure, the following uses a specific embodiment to provide further explanation with reference to the accompanying drawings, and this embodiment does not constitute a limitation on this embodiment of the present disclosure.

Figure 3:
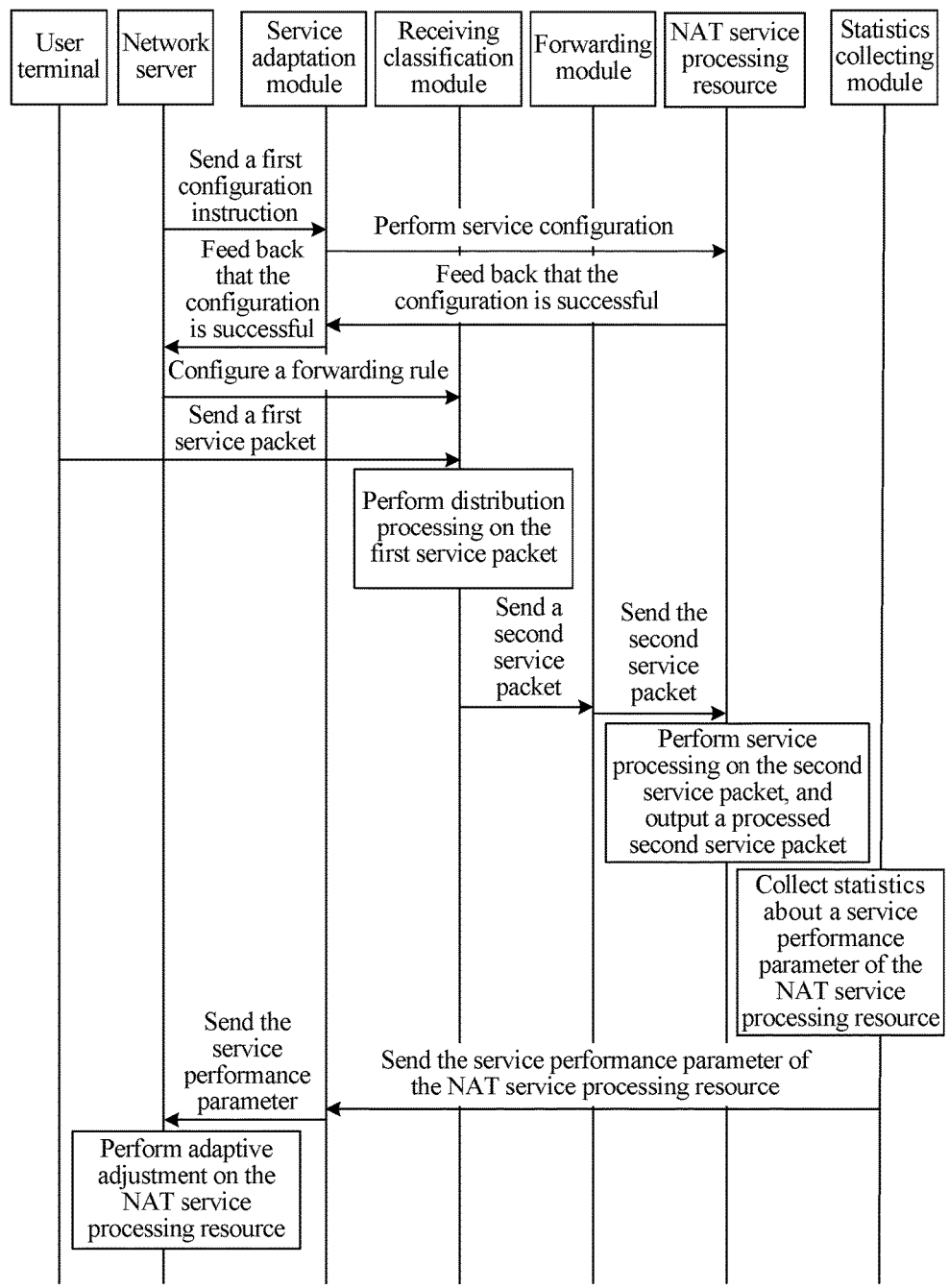
FIG. 3 is a signaling diagram of a process in which a single service processing resource implements network service processing according to an embodiment of the present disclosure.

The following is described in detail according to FIG. 3. FIG. 3 is a signaling diagram of a process in which a single service processing resource implements network service processing according to an embodiment of the present disclosure.

Specifically, as shown in FIG. 3, an example in which one service processing resource performs service processing on a service packet is used for description. According to the description in step 110 to step 140 in the embodiment of the present disclosure, corresponding configuration is performed on the service processing resource and a receiving classification module. After the configuration is completed, when a user terminal accesses a network, the receiving classification module receives a first service packet sent by the user terminal, and identifies whether a characteristic attribute (for example, IP address information, port number information, and a VLANID identifier of a service packet, where the IP address information herein includes but is not limited to source IP address information and destination IP address information) of the first service packet matches a service characteristic (for example, IP address information, port number information, and a VLANID identifier of a packet for which a NAT service needs to be executed) of a service (for example, the NAT service) in a forwarding rule. If the characteristic attribute of the first service packet matches the service characteristic of the service in the forwarding rule, the receiving classification module determines, according to the forwarding rule, a service processing resource (for example, a NAT service processing resource) that is to perform service processing on the first service packet, that is, distribution processing is performed on the first service packet. That is, it is determined that the first service packet needs only a single service processing resource to implement corresponding service processing.

When it is determined that one service processing resource is to perform service processing on the first service packet, address information of the NAT service processing resource is acquired from the forwarding rule. The receiving classification module performs encapsulation processing (the encapsulation processing is specifically encapsulating identification information of the NAT service processing resource and address information of the NAT service processing resource into a header of the first service packet) on the first service packet to obtain a second service packet, where the second service packet includes the identification information of the NAT service processing resource and the address information of the NAT service processing resource. The receiving classification module sends the second service packet to a forwarding module, and the forwarding module sends the second service packet to the NAT service processing resource according to the identification information and the address information. The NAT service processing resource receives the second service packet, performs corresponding NAT service processing on the second service packet, and outputs a processed second service packet.

At the same time when the NAT service processing resource performs service processing on the second service packet, a statistics collecting module collects statistics about a service performance parameter for the NAT service processing resource, and sends the service performance parameter to a service adaptation module. The service adaptation module sends the service performance parameter to a network server, where the service performance parameter is used as a basis for the network server to adjust service load for the NAT service processing resource. When the NAT service processing resource needs to be changed, according to the service performance parameter, the network server performs capacity expansion processing on the NAT service processing resource or performs service reconfiguration processing on the NAT service processing resource.

Embodiment 4

To help understand this embodiment of the present disclosure, the following uses a specific embodiment to provide further explanation with reference to the accompanying drawings, and this embodiment does not constitute a limitation on this embodiment of the present disclosure.

Figure 4A:
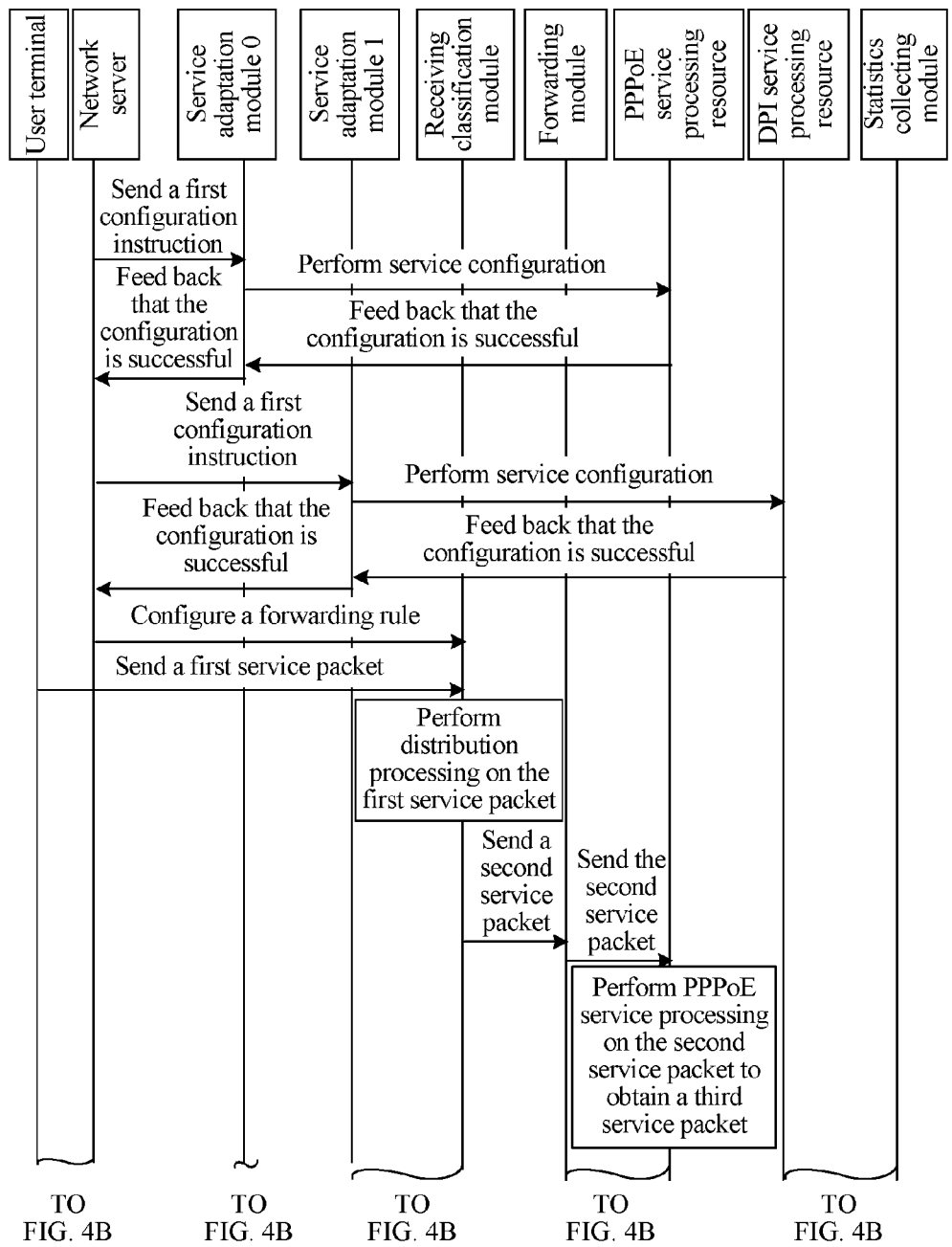
FIG. 4A and FIG. 4B are a signaling diagram of a process in which multiple service processing resources implement network service processing according to an embodiment of the present disclosure.
Figure 4B:
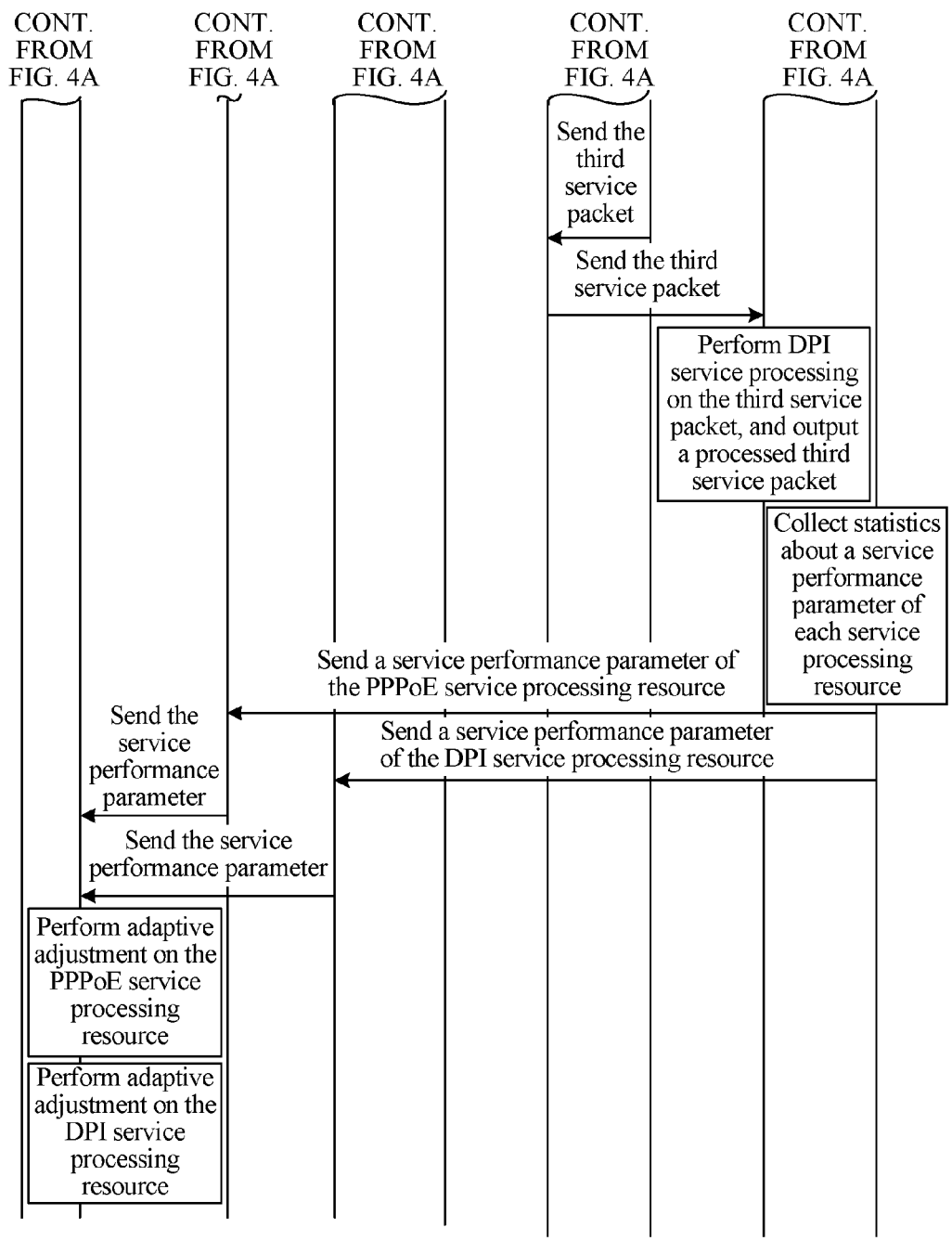

The following is described in detail according to FIG. 4A and FIG. 4B. FIG. 4A and FIG. 4B are a signaling diagram of a process in which multiple service processing resources implement network service processing according to an embodiment of the present disclosure.

Specifically, as shown in FIG. 4A and FIG. 4B, an example in which two service processing resources perform service processing on a service packet is used for description. According to the description in step 110 to step 140 in the embodiment of the present disclosure, corresponding configuration is performed on the service processing resources and a receiving classification module. After the configuration is completed, when a user terminal accesses a network, the receiving classification module receives a first service packet sent by the user terminal, and identifies whether a characteristic attribute (for example, IP address information, port number information, and a VLANID identifier of a service packet, where the IP address information herein includes but is not limited to source IP address information and destination IP address information) of the first service packet matches a service characteristic (for example, IP address information, port number information, and a VLANID identifier of a packet for which a PPPoE service and a DPI service need to be executed) of several services (for example, the PPPoE service and the DPI service) in a forwarding rule. If the characteristic attribute of the first service packet matches the service characteristic of the several services in the forwarding rule, the receiving classification module determines, according to the forwarding rule, service processing resources (for example, a PPPoE service processing resource and a DPI service processing resource) that are to perform service processing on the first service packet, that is, distribution processing is performed on the first service packet. That is, it is determined that the first service packet needs multiple service processing resources to implement corresponding service processing.

When it is determined that two service processing resources are to process two services of the first service packet, a processing sequence of the PPPoE service processing resource and the DPI service processing resource is further determined, and address information of the PPPoE service processing resource and address information of the DPI service processing resource are acquired from the forwarding rule according to the processing sequence of the PPPoE service processing resource and the DPI service processing resource. The receiving classification module performs encapsulation processing (the encapsulation processing is specifically encapsulating, into a header of the first service packet, identification information of the PPPoE service processing resource and identification information of the DPI service processing resource, address information of the service processing resources, and sequence information for processing services by the service processing resources) on the first service packet to obtain a second service packet, where the second service packet includes the PPPoE service processing resource, the address information of the service processing resources, the identification information of the DPI service processing resource, and the sequence information for processing services by the service processing resources. The receiving classification module sends the second service packet to a forwarding module, and the forwarding module sends, according to the identification information, the address information, and the sequence information, the second service packet to the first service processing resource (for example, the PPPoE service processing resource) indicated by the sequence information. The PPPoE service processing resource receives the second service packet, and performs corresponding PPPoE service processing on the second service packet. In addition, the PPPoE service processing resource determines, according to the sequence information, that DPI service processing needs to be further performed on the second service packet; then, the PPPoE service processing resource performs encapsulation processing (the encapsulation processing is specifically encapsulating the identification information of the DPI service processing resource, the address information of the DPI service processing resource, and the sequence information into a header of the second service packet) on the second service packet to obtain a third service packet. The third service packet includes the identification information of the DPI service processing resource, the address information of the DPI service processing resource, and the sequence information. The PPPoE service processing resource sends the third service packet to the forwarding module, and the forwarding module sends, according to the identification information and the address information, the third service packet to the DPI service processing resource indicated by the identification information. The DPI service processing resource receives the third service packet, performs corresponding DPI service processing on the third service packet, and outputs a processed third service packet.

At the same time when the PPPoE service processing resource and the DPI service processing resource respectively perform service processing on the second service packet and the third service packet, a statistics collecting module separately collects statistics about a service performance parameter for the PPPoE/DPI service processing resource, and separately sends each service performance parameter to a corresponding service adaptation module. Each service adaptation module separately sends the service performance parameter to a network server, where the service performance parameter is used as a basis for the network server to adjust service load for the PPPoE/DPI service processing resource. When the PPPoE/DPI service processing resource needs to be changed, according to the service performance parameter, the network server performs capacity expansion processing on the PPPoE/DPI service processing resource or performs service reconfiguration processing on the PPPoE/DPI service processing resource.

It may be understood that, because the sequence information in the second service packet includes a sequence of only two service processing resources, and one service of the second service packet has already been processed, the DPI service processing resource directly outputs the processed third service packet. In an actual application, if a service packet needs to be processed by at least two service processing resources, a processing process is similar to the foregoing process, and details are not described herein again.

Embodiment 5

To help understand this embodiment of the present disclosure, the following uses a specific embodiment to provide further explanation with reference to the accompanying drawings, and this embodiment does not constitute a limitation on this embodiment of the present disclosure.

Figure 5A:
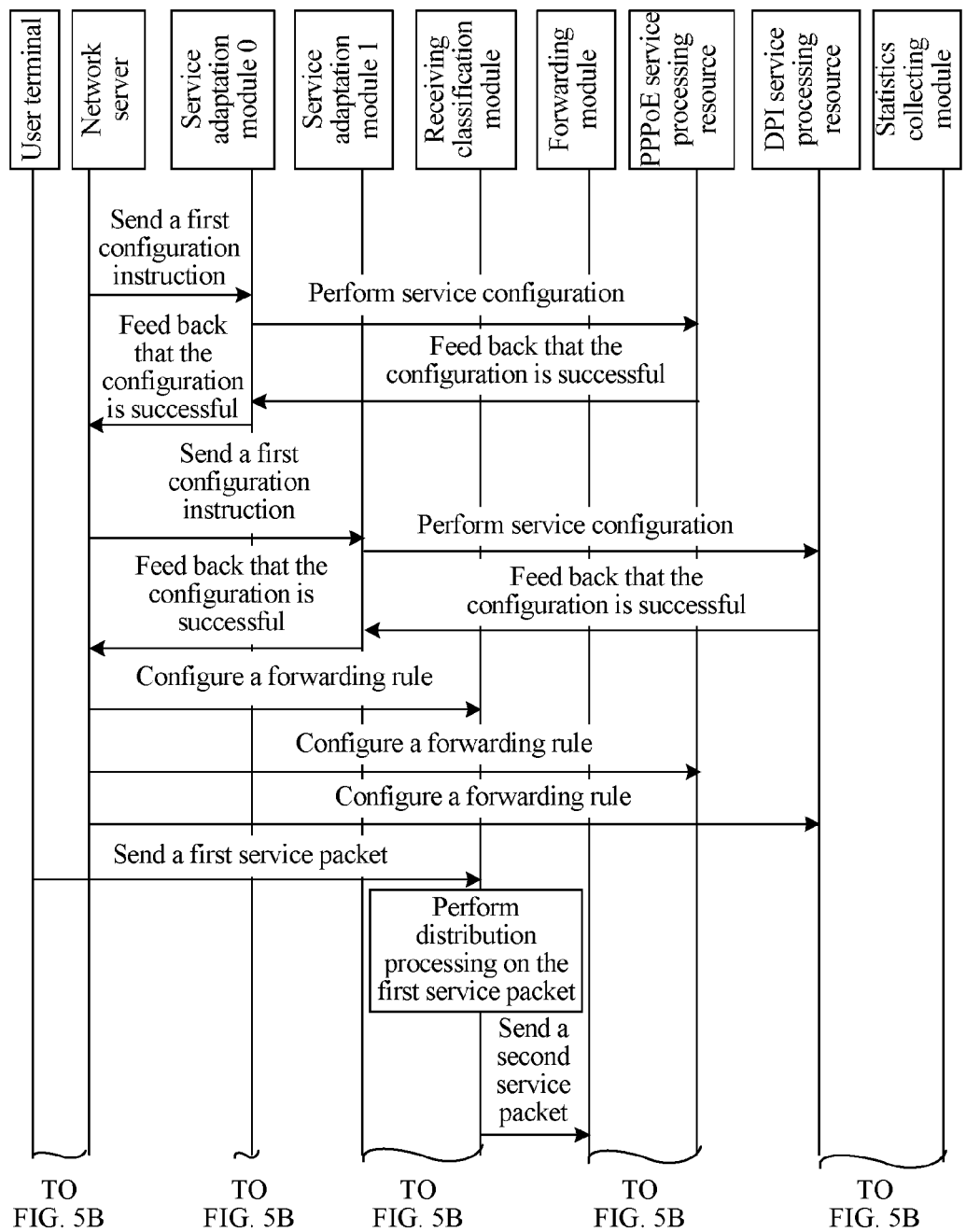
FIG. 5A and FIG. 5B are another signaling diagram of a process in which multiple service processing resources implement network service processing according to an embodiment of the present disclosure.
Figure 5B:
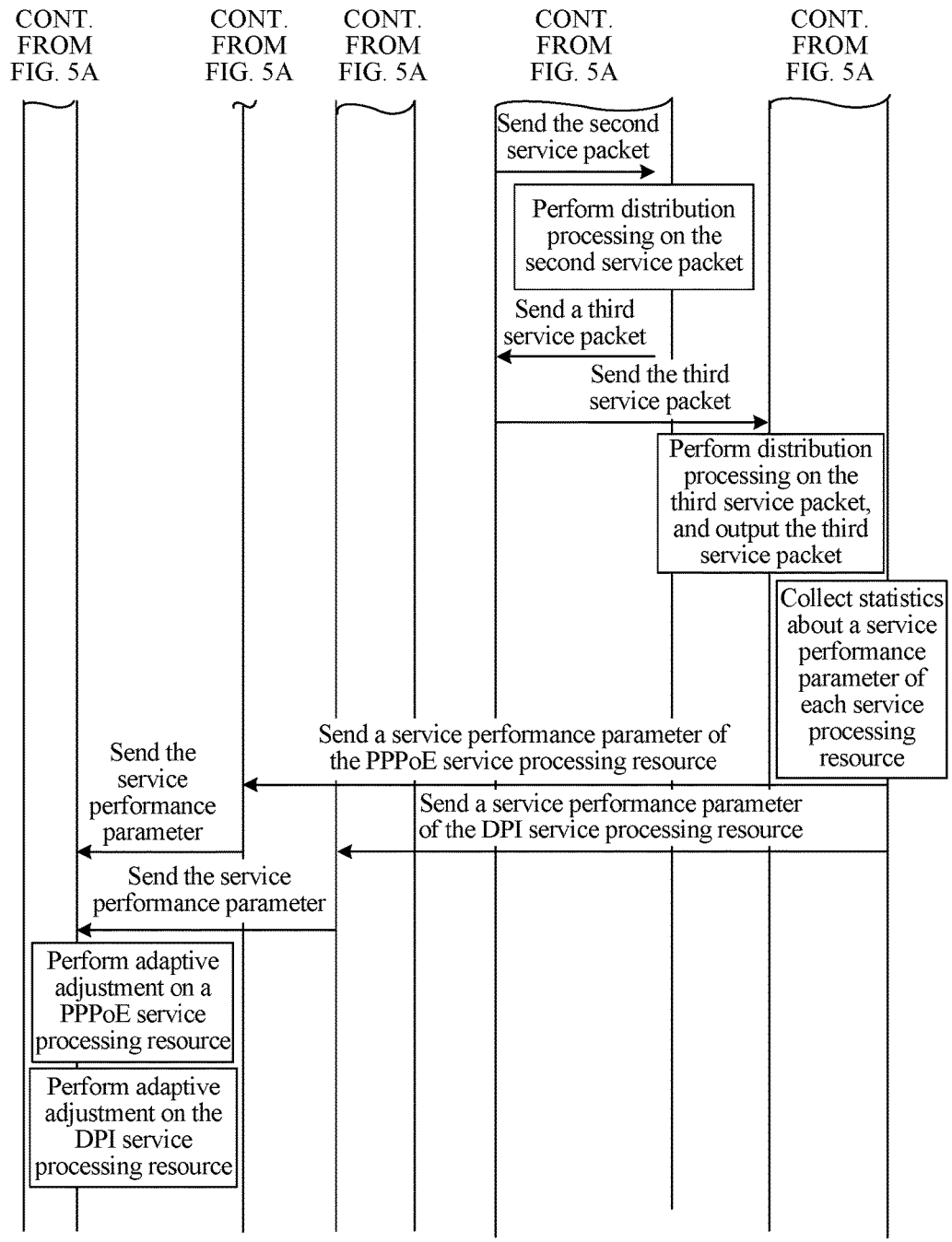

The following is described in detail according to FIG. 5A and FIG. 5B. FIG. 5A and FIG. 5B are another signaling diagram of a process in which multiple service processing resources implement network service processing according to an embodiment of the present disclosure.

In Embodiment 4, when performing encapsulation processing on the first service packet, the receiving classification module encapsulates identification information of multiple service processing resources and sequence information of the multiple service processing resources in the header of the first service packet to obtain the second service packet, so that the header of the second service packet is too large, which hinders packet transmission.

In this embodiment of the present disclosure, the header of the first service packet is simplified to facilitate packet transmission.

Specifically, as shown in FIG. 5A and FIG. 5B, an example in which two service processing resources perform service processing on a service packet is used for description. According to the description in step 110 to step 140 in the embodiment of the present disclosure, corresponding configuration is performed on the service processing resources and a receiving classification module. After the configuration is completed, when a user terminal accesses a network, the receiving classification module receives a first service packet sent by the user terminal, and identifies whether a characteristic attribute (for example, IP address information, port number information, and a VLANID identifier of a service packet, where the IP address information herein includes but is not limited to source IP address information and destination IP address information) of the first service packet matches a service characteristic (for example, IP address information, port number information, and a VLANID identifier of a packet for which a PPPoE service and a DPI service need to be executed) of several services (for example, the PPPoE service and the DPI service) in a forwarding rule. If the characteristic attribute of the first service packet matches the service characteristic of the several services in the forwarding rule, the receiving classification module determines, according to the forwarding rule, service processing resources (for example, a PPPoE service processing resource and a DPI service processing resource) that are to perform service processing on the first service packet, that is, distribution processing is performed on the first service packet. That is, it is determined that the first service packet needs multiple service processing resources to implement corresponding service processing.

When it is determined that two service processing resources are to process two services of the first service packet, a processing sequence of the PPPoE service processing resource and the DPI service processing resource is further determined, and address information of the PPPoE service processing resource and address information of the DPI service processing resource are acquired from the forwarding rule according to the processing sequence of the PPPoE service processing resource and the DPI service processing resource. The receiving classification module performs encapsulation processing (the encapsulation processing is specifically encapsulating, into a header of the first service packet according to the service processing sequence of the two service processing resources, identification information and address information of the first service processing resource in the service processing sequence, for example, identification information and the address information of the PPPoE service processing resource) on the first service packet to obtain a second service packet. The second service packet includes the identification information and the address information of the PPPoE service processing resource. The receiving classification module sends the second service packet to a forwarding module, and the forwarding module forwards the second service packet to the PPPoE service processing resource. The PPPoE service processing resource performs corresponding PPPoE service processing on the second service packet, and identifies whether a characteristic attribute of the second service packet matches a service characteristic of several services (for example, the DPI service) in a service forwarding rule table. If the characteristic attribute of the second service packet matches the service characteristic of the several services in the service forwarding rule table, the PPPoE service processing resource determines a service processing resource (for example, the DPI service processing resource) that further needs to perform service processing on the second service packet, and the DPI service processing resource acquires identification information and the address information of the DPI service processing resource from the forwarding rule. If the characteristic attribute of the second service packet does not match the service characteristic of the several services in the service forwarding rule table, the second service packet is output. The PPPoE service processing resource performs encapsulation processing (the encapsulation processing is specifically encapsulating the identification information and the address information of the DPI service processing resource into a header of the second service packet) on the second service packet to obtain a third service packet, where the third service packet includes the identification information and the address information of the DPI service processing resource. The PPPoE service processing resource sends the third service packet to the forwarding module, and the forwarding module sends, according to the identification information and the address information, the third service packet to the DPI service processing resource indicated by the identification information. The DPI service processing resource receives the third service packet, and the DPI service processing resource performs corresponding DPI service processing on the third service packet, and identifies whether a characteristic attribute of the third service packet matches the service characteristic of the several services in the service forwarding rule table. If the characteristic attribute of the third service packet matches the service characteristic of the several services in the service forwarding rule table, the DPI service processing resource determines a service processing resource that further needs to perform service processing on the third service packet. If the characteristic attribute of the third service packet does not match the service characteristic of the several services in the service forwarding rule table, a processed third service packet is output.

At the same time when the PPPoE service processing resource and the DPI service processing resource respectively perform service processing on the second service packet and the third service packet, a statistics collecting module separately collects statistics about a service performance parameter for the PPPoE/DPI service processing resource, and separately sends each service performance parameter to a corresponding service adaptation module. Each service adaptation module sends the service performance parameter to a network server, where the service performance parameter is used as a basis for the network server to adjust service load for the PPPoE/DPI service processing resource. When the PPPoE/DPI service processing resource needs to be changed, according to the service performance parameter, the network server performs capacity expansion processing on the PPPoE/DPI service processing resource or performs service reconfiguration processing on the PPPoE/DPI service processing resource.

It may be understood that, because a forwarding rule is separately configured on each service processing resource, each service processing resource determines a service processing resource that subsequently processes a service packet, which reduces bytes of a header of the service packet, facilitates flexible transmission of the service packet, and improves processing efficiency of each service processing resource.

In an actual application, if a service packet needs to be processed by at least two service processing resources, a processing process is similar to the foregoing process, and details are not described herein again.

A person in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that such implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefit effects of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the principle of the present disclosure shall fall within the protection scope of the present disclosure.

What is claimed is:

1. A network service processing method, wherein the method comprises:
    partitioning a field-programmable gate array (FPGA) or a network processor (NP) into multiple mutually isolated service processing resources;
    receiving a first configuration instruction, wherein the first configuration instruction comprises a first service configuration execution file;
    performing service configuration on a service processing resource according to the first service configuration execution file, so that the service processing resource has a first service function for implementing processing of a first service;
    receiving a forwarding rule used when service forwarding is to be performed on a to-be-processed service packet;
    receiving the to-be-processed service packet sent by a user terminal, and distributing the to-be-processed service packet to the service processing resource by using the forwarding rule, so that the service processing resource performs service processing on the to-be-processed service packet;
    receiving a second configuration instruction when the service processing resource needs a service function different from the first service function, wherein the second configuration instruction comprises a second service configuration execution file; and
    performing service reconfiguration on the service processing resource according to the second service configuration execution file, so that the service processing resource has a second service function for implementing processing of a second service.

2. The network service processing method according to claim 1, wherein distributing the to-be-processed service packet to the service processing resource using the forwarding rule comprises:
    determining, by using the forwarding rule, a quantity of service processing resources that are to perform service processing on the to-be-processed service packet;
    when one service processing resource is to perform service processing on the to-be-processed service packet, distributing the to-be-processed service packet to the determined one service processing resource; and
    when multiple service processing resources are to perform service processing on the to-be-processed service packet, determining a processing sequence for the service processing resources to process the to-be-processed service packet, and distributing, according to the determined processing sequence, the to-be-processed service packet to the first service processing resource in the processing sequence.

3. The network service processing method according to claim 2, wherein the method further comprises:
    when the service processing resource performs service processing on the to-be-processed service packet, collecting, by the FPGA or the NP, statistics about a service performance parameter used for performing performance monitoring on the service processing resource; and
    sending, by the FPGA or the NP, the service performance parameter to a network server, wherein the service performance parameter is used as a basis for the network server to adjust service load for the service processing resource.

4. The network service processing method according to claim 1, wherein the method further comprises:
    when the service processing resource performs service processing on the to-be-processed service packet, collecting, by the FPGA or the NP, statistics about a service performance parameter used for performing performance monitoring on the service processing resource; and
    sending, by the FPGA or the NP, the service performance parameter to a network server, wherein the service performance parameter is used as a basis for the network server to adjust service load for the service processing resource.

5. A network service processing apparatus, wherein the apparatus comprises: a processor, and a field-programmable gate array (FPGA) or a network processor (NP), wherein
    the processor is configured to
    a) partition the FPGA or the NP into multiple mutually isolated service processing resources;
    b) receive a first configuration instruction, wherein the first configuration instruction comprises a first service configuration execution file;
    c) perform service configuration on a service processing resource according to the first service configuration execution file, so that the service processing resource has a first service function for implementing processing of a first service;
    d) receive a second configuration instruction when the service processing resource needs a service function different from the first service function, wherein the second configuration instruction comprises a second service configuration execution file; and e) perform service reconfiguration on the service processing resource according to the second service configuration execution file, so that the service processing resource has a second service function for implementing processing of a second service; and the FPGA or the NP is configured to
- a) receive a forwarding rule used when service forwarding is to be performed on the to-be-processed service packet; and
- b) receive a to-be-processed service packet sent by a user terminal, and distribute the to-be-processed service packet to the service processing resource by using the forwarding rule, so that the service processing resource performs service processing on the to-be-processed service packet.

6. The network service processing apparatus according to claim 5, wherein:

the FPGA or the NP is further configured to set the forwarding rule; and the service processing resource is configured to set the forwarding rule on the service processing resource.

7. The network service processing apparatus according to claim 6, wherein the FPGA or the NP is further configured to:

determine, according to the forwarding rule, a quantity of service processing resources that are to perform service processing on the to-be-processed service packet;

when one service processing resource is to perform service processing on the to-be-processed service packet, distribute the to-be-processed service packet to the determined one service processing resource; and when multiple service processing resources are to perform service processing on the to-be-processed service packet, determine a processing sequence for the service processing resources to process the to-be-processed service packet, and distribute, according to the determined processing sequence, the to-be-processed service packet to the first service processing resource in the processing sequence.

8. The network service processing apparatus according to claim 7, wherein the first service processing resource is further configured to:

receive the to-be-processed service packet transmitted by the FPGA or the NP;

perform corresponding service processing on the to-be-processed service packet;

determine, according to the forwarding rule, a next-level service processing resource that is to perform service processing on the to-be-processed service packet; and transmit a processed service packet to the next-level service processing resource.

9. The network service processing apparatus according to claim 8, wherein:

the FPGA or the NP is further configured to:

when the service processing resource performs service processing on the to-be-processed service packet, collect statistics about a service performance parameter used for performing performance monitoring on the service processing resource, and send the service performance parameter to the processor; and the processor is further configured to send the service performance parameter to a network server, wherein the service performance parameter is used as a basis for the network server to adjust service load for the service processing resource.

10. The network service processing apparatus according to claim 9, wherein the FPGA or the NP is further configured to:

receive a service packet processed by the service processing resource, and output the service packet; and forward the service packet between the multiple service processing resources.

11. The network service processing apparatus according to claim 5, wherein:

the FPGA or the NP is further configured to set the forwarding rule on the FPGA or the NP; and the service processing resource is further configured to set the forwarding rule on the service processing resource.

12. The network service processing apparatus according to claim 11, wherein the FPGA or the NP is further configured to:

determine, according to the forwarding rule, a quantity of service processing resources that are to perform service processing on the to-be-processed service packet;

when one service processing resource is to perform service processing on the to-be-processed service packet, distribute the to-be-processed service packet to the determined one service processing resource; and when multiple service processing resources are to perform service processing on the to-be-processed service packet, determine a processing sequence for the service processing resources to process the to-be-processed service packet, and distribute, according to the determined processing sequence, the to-be-processed service packet to the first service processing resource in the processing sequence.

13. The network service processing apparatus according to claim 12, wherein the first service processing resource is further configured to:

receive the to-be-processed service packet transmitted by the FPGA or the NP;

perform corresponding service processing on the to-be-processed service packet;

determine, according to the forwarding rule, a next-level service processing resource that is to perform service processing on the to-be-processed service packet; and transmit a processed service packet to the next-level service processing resource.

14. The network service processing apparatus according to claim 13, wherein:

the FPGA or the NP is further configured to:

when the service processing resource performs service processing on the to-be-processed service packet, collect statistics about a service performance parameter used for performing performance monitoring on the service processing resource, and send the service performance parameter to the processor; and the processor is further configured to send the service performance parameter to a network server, wherein the service performance parameter is used as a basis for the network server to adjust service load for the service processing resource.

15. The network service processing apparatus according to claim 14, wherein the FPGA or the NP is further configured to:

receive a service packet processed by the service processing resource, and output the service packet; and forward the service packet between the multiple service processing resources.

\* \* \* \* \*